(12) United States Patent
Yasue et al.

(10) Patent No.: US 8,072,622 B2
(45) Date of Patent: Dec. 6, 2011

(54) PRINTER, AND METHOD FOR CONTROLLING PRINT CONTROLLER

(75) Inventors: Takuya Yasue, Nagano (JP); Shuichi Shima, Nagano (JP); Reiko Nomura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1365 days.

(21) Appl. No.: 11/235,190

(22) Filed: Sep. 27, 2005

(65) Prior Publication Data

US 2006/0071953 A1   Apr. 6, 2006

(30) Foreign Application Priority Data

Sep. 27, 2004  (JP) ............................... P2004-280623
Sep. 28, 2004  (JP) ............................... P2004-281452
Aug. 24, 2005  (JP) ............................... P2005-243200

(51) Int. Cl.
*B41J 29/38* (2006.01)
(52) U.S. Cl. ............. 358/1.13; 358/1.15; 347/5; 347/12
(58) Field of Classification Search .................. 358/1.13; 347/5, 102
See application file for complete search history.

(56) References Cited

U.S. PATENT DOCUMENTS

| | | | |
|---|---|---|---|
| 5,706,410 A * | 1/1998 | Bagley et al. ................. | 358/1.13 |
| 6,426,798 B1 | 7/2002 | Yeung | |
| 6,614,546 B1 | 9/2003 | Kurozasa | |
| 6,879,408 B1 * | 4/2005 | Hori et al. .................... | 358/1.13 |
| 7,145,679 B2 | 12/2006 | Hitaka | |
| 7,379,198 B1 * | 5/2008 | Ishida ........................ | 358/1.15 |
| 2002/0030839 A1 * | 3/2002 | Kawanabe et al. .......... | 358/1.13 |
| 2002/0030848 A1 * | 3/2002 | Moriyama et al. .......... | 358/1.15 |
| 2002/0062453 A1 * | 5/2002 | Koga ........................... | 713/202 |
| 2003/0184633 A1 * | 10/2003 | Vanhooydonck ............. | 347/102 |
| 2003/0234950 A1 * | 12/2003 | Lay ............................... | 358/1.14 |
| 2004/0218209 A1 * | 11/2004 | Hamaguchi et al. ........ | 358/1.15 |
| 2005/0162696 A1 * | 7/2005 | Helms et al. ................ | 358/1.18 |

FOREIGN PATENT DOCUMENTS

| | | |
|---|---|---|
| JP | 10-312251 A | 11/1998 |
| JP | 2000-298570 A | 10/2000 |
| JP | 2001-071596 A | 3/2001 |
| JP | 2002-200796 A | 7/2002 |
| JP | 2002-215361 A | 8/2002 |
| JP | 2002-264323 A | 9/2002 |
| JP | 2002-292967 A | 10/2002 |
| JP | 2003-271340 A | 9/2003 |
| JP | 2004-114618 A | 4/2004 |
| WO | WO 2004-014074 A1 | 2/2004 |

* cited by examiner

*Primary Examiner* — King Poon
*Assistant Examiner* — Allen H Nguyen
(74) *Attorney, Agent, or Firm* — Sughrue Mion, PLLC

(57) ABSTRACT

A printer 1 has an I/F section 31 for receiving data from a PC 2, a parameter-deriving section 35*b* for deriving a control constant on the basis of print setting information included in the received data, and a printer section 11 which performs printing operation on the basis of the print setting information, the control constant, and print data included in the received data.

6 Claims, 14 Drawing Sheets

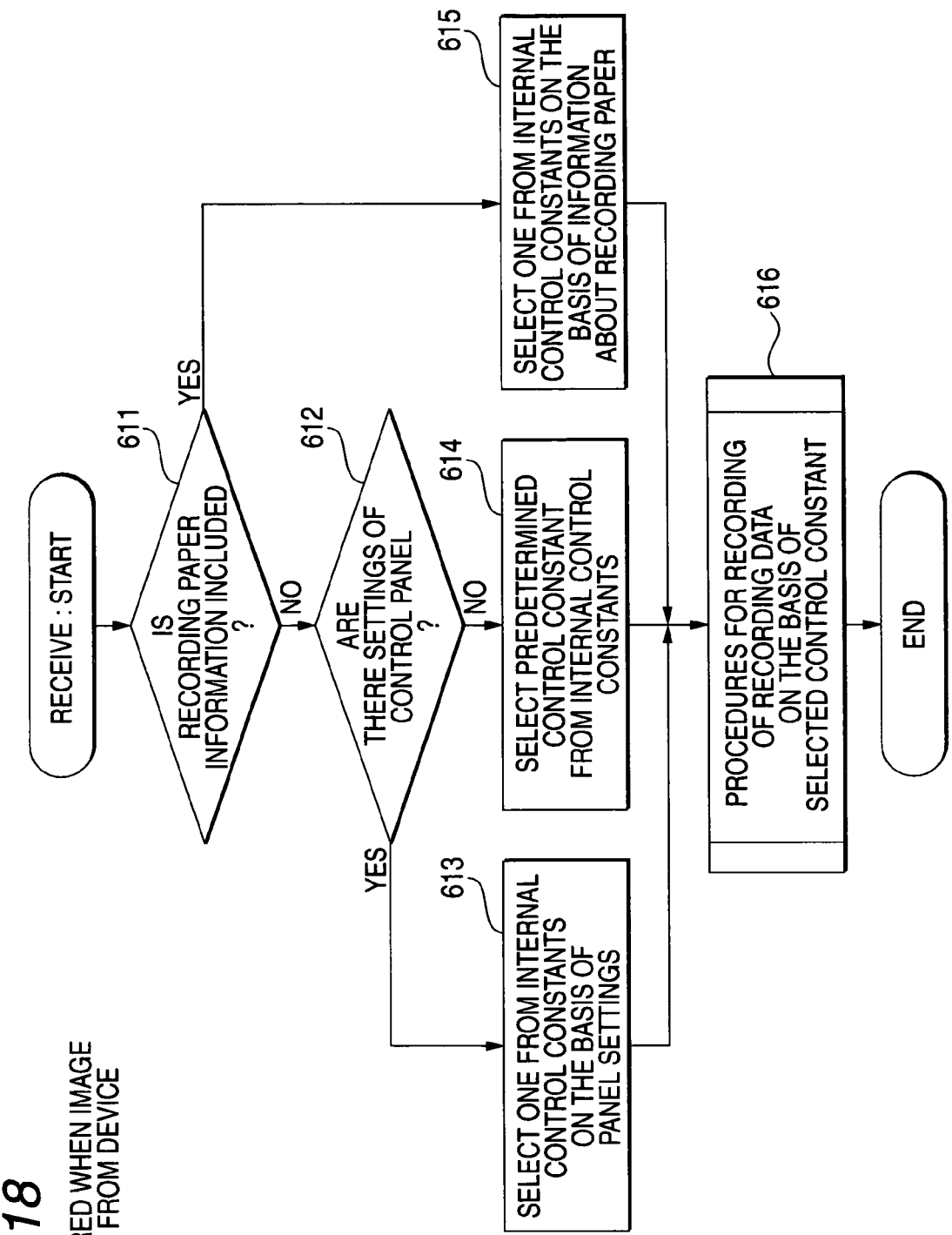
FIG. 18 PROCEDURES REQUIRED WHEN IMAGE DATA ARE RECEIVED FROM DEVICE

PRINTER, AND METHOD FOR CONTROLLING PRINT CONTROLLER

BACKGROUND OF THE INVENTION

The present invention relates to a printer which subjects print data to printing through use of parameters, as well as to a method for controlling a print controller which controls the printer.

Conventionally, when printing is carried out by connecting a printing device, such as a printer, to a host machine, such as a personal computer (PC), a printer driver compatible with the printer is generally installed in the PC, and printing is performed on the basis of the print data output by means of the printer driver. More specifically, the printer driver converts into print data image data to be printed by the printer. When the print data are transmitted from the PC to the printer, the printer carries out printing on the basis of the thus-received print data. Model-specific parameters are attached to the print data as control parameters which are used when print data are subjected to printing. The printer carries out printing by use of these model-specific parameters.

In JP-A-2004-114618, there is proposed a configuration in which a printer corrects the amount of paper feed upon receipt from the host machine of paper-feeding parameters as model-specific parameters.

However, in the above related-art configuration, the data unique to the model of the printer are supplied from the outside of the printer, and hence there arises a problem of general versatility of a driver being low.

The present invention has been conceived in view of the above-described circumstance, and aims at providing a printer capable of enhancing general versatility of a driver, and a method and highly-versatile program for controlling a print controller.

SUMMARY OF THE INVENTION

In order to solve the problem, an embodiment of the present invention lie in a printing device comprising:
  a receiving section for receiving data from a host machine;
  a nonvolatile storage medium where control constants are stored;
  a parameter deriving section for deriving the control constants in association with a combination of a plurality of print setting information items included in the received data; and
  a printing section which performs printing on the basis of the print setting information, the control constants, and predetermined print data.

The printing device can derive control constants on the basis of the print setting information input by the host machine. Consequently, general versatility of a driver can be enhanced.

Further, when having received data including the control constants, the printing section may perform printing on the basis of the control constants and the print data.

Further, when some control constants required for printing are received by the receiving section, remaining control constants required for printing are derived by the parameter deriving section.

The control constants are parameters unique to the printing device.

A method for controlling a print controller according to an embodiment of the present invention lie in comprising the steps of:

determining whether or not a printing device can derive control constants on the basis of predetermined information acquired from the printing device; and generating a print command including the control constants when the printing device cannot derive the control constants.

As a result, the method becomes compatible with a printing device which cannot derive control constants. Specifically, the method can be embodied as a driver having high general versatility.

Moreover, the method may further comprise the step of:
  determining whether or not the printing device can derive the control constants by acquiring the predetermined information when connected to the printing device.

The method may further comprise the step of:
  generating a print command, which includes predetermined print information but not the control constants, when the printing device can derive the control constants.

Moreover, the method further comprises the step of:
  determining that the printing device cannot derive the control constants when the printing device is not compatible with the predetermined print setting information.

The method may further comprise the step of:
  generating a print command including control constants which cannot be derived by the printing device and print setting information corresponding to control constants which can be derived by the printing device.

Further, an embodiment of the present invention is a program by means of which a control section performs processing for generating a print command in accordance with predetermined input print setting information, wherein the control section performs
  processing for determining whether or not the printing device can derive control constants on the basis of predetermined information acquired from a printing device; and
  processing for generating a print command including the control constants when the printing device cannot derive the control constants, By adoption of such a program, the present invention can cope with a printing device which cannot derive control constants; namely; the program can be embodied as a highly-versatile driver.

The control section may perform processing for determining whether or not the printing device can derive the control constants by acquiring the predetermined information when being connected to the printing device.

The printing device may perform processing for generating a print command, which includes predetermined print setting information but not the control constants, when the printing device can derive the control constants.

The control section may perform processing for determining that the printing device cannot derive the control constants when the printing device is not compatible with the predetermined print setting information.

The present disclosure relates to the subject matter contained in Japanese patent application Nos. 2004-280623 filed on Sep. 27, 2004, 2004-281452 filed on Sep. 28, 2004 and 2005-243200 filed on Aug. 24, 2005, each of which is expressly incorporated herein by reference in its entirety.

BRIEF DESCRIPTION OF THE DRAWINGS

FIG. 18 is a flowchart required when image data are received from a device.

DESCRIPTION OF THE PREFERRED EMBODIMENT

First Embodiment

A first embodiment embodying the present invention will be described hereinbelow by reference to FIGS. 1 to 7.

Figure 1:
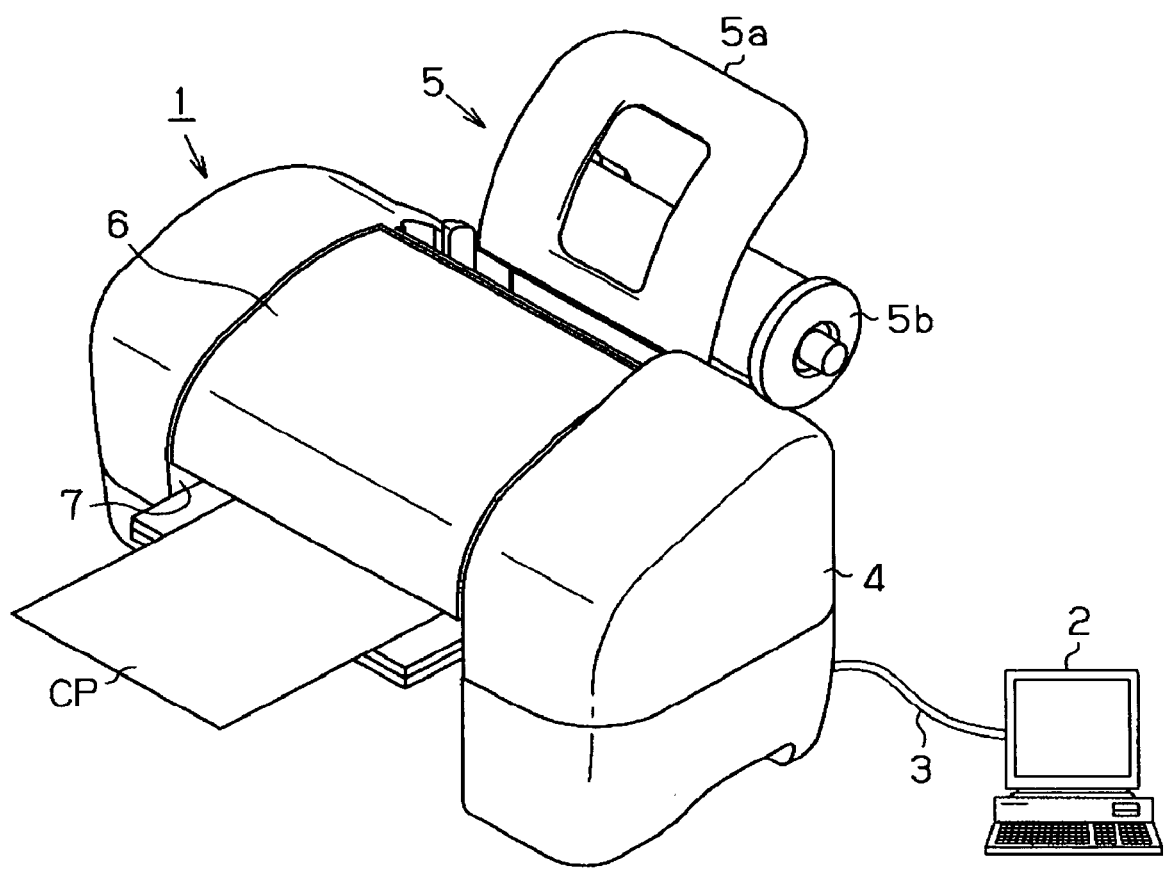
FIG. 1 is a diagrammatic view showing a printing system according to in embodiment of the present invention.

FIG. 1 is a perspective view showing the appearance of a printing device according to the present embodiment. This printing device is an inkjet printer 1 capable of outputting a color image, and performs printing on the basis of print data transmitted from a personal computer (hereinafter abbreviated as "PC") 2 serving as a host machine. In the present embodiment, the printer 1 and the PC 2 are connected together by way of, e.g., a USB cable 3.

A paper feeder 5 is provided on the back of a main body 4 of the printer 1, and a printing medium which can undergo printing performed by the printer 1 is fed from the paper feeder 5 to the inside of the main body 4. In the present embodiment, cut paper, which is employed as a cut sheet, set in a sheet feeder 5a or rolled paper—being set in a rolled-paper support section 5b and serving as long paper—is fed to the inside of the main body 4 (the printing medium, such as cut paper, rolled paper, or the like, is hereinafter referred to as "paper"). A printer section (omitted from FIG. 1) to be described later is disposed in a position below a cover 6 provided in the center of the main body 4. The paper (cut paper: CP in the present embodiment) having undergone printing by means of operation of the printer section is output from a paper output port 7 formed in a lower portion of the front side of the main body 4.

A schematic configuration of the printer 1 will now be described by reference to FIG. 2.

Figure 2:
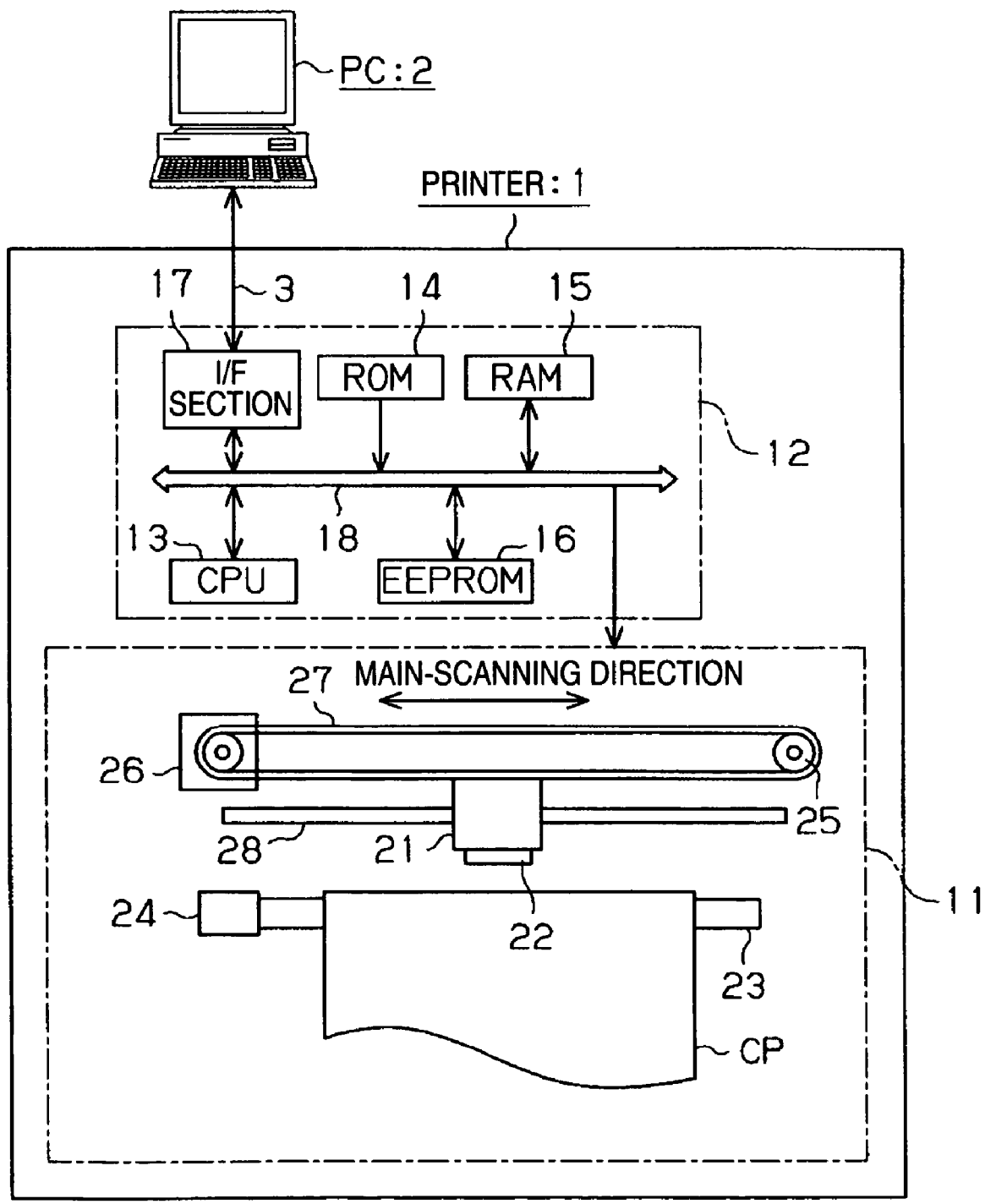
FIG. 2 is a diagrammatic view showing the internal configuration of a printer.

As shown in FIG. 2, the printer 1 has a printer section 11 serving as a printing section which subjects paper (the cut paper: CP in the present embodiment) to printing, and a control circuit 12 for controlling this printer section 11. The control circuit 12 has a CPU 13, ROM 14, RAM 15, EEPROM 16 serving as a nonvolatile storage medium, and an interface section (hereinafter called an "I/F" section) 17 serving as a receiving section. These are connected together by way of an internal bus 18. The PC 2 is connected to the I/F section 17 by way of the USB cable 8, and the I/F section 17 receives data from the PC 2.

The CPU 13 executes processing in accordance with a program or data stored in the ROM 14 and the EEPROM 16, thereby controlling the printer 1 in a centralized manner. Specifically, on the basis of the print data input from the PC 2 by way of the I/F section 17, driving of a carriage motor 26 which reciprocally moves a print head 22 to be described later is controlled. Ejection/nonejection of an ink droplet from the print head 22 or the quantity of ink droplets ejected is contacted on the basis of the print data received from the PC 2. As will be described later, the CPU 13 functions as a model-specific parameter output-section which outputs model-specific parameters used during print processing operation of the printer section 11.

The printer section 11 has a carriage 21 carrying an unillustrated black ink cartridge and an unillustrated color ink cartridge, and the print head 22 is attached to the carriage 21. The print head 22 is disposed opposite a platen 28 which guides, in a transporting direction of the paper, the paper fed from the paper feeder 5. This platen 23 is driven by a paper-advance motor 24. When the paper-advance motor 24 is driven, the paper laid on the platen 23 is transported in the transporting direction while being subjected to printing performed by the print head 22.

The carriage 21 is fastened to an endless drive belt 27 which is passed around a pulley 25 in a tensioned manner and driven by the carriage motor 26, and is slidably supported by a slidably-movable shaft 28. As a result of the carnage motor 26 being driven, the carriage 21 is reciprocally driven in a main scanning direction along the slidably-movable shaft 28 by way of the drive belt 27. A plurality of nozzle apertures (omitted from the drawings) used for ejecting ink droplets are formed in the print head 22. When the carriage 21 is reciprocally moved, ink droplets are ejected from the nozzle apertures at predetermined timings, whereupon paper undergoes two-way printing.

In the present embodiment, the model-specific parameters is control constants (parameters) used when the printer section 11 is driven and controlled. These control constants (parameters) may include, e.g., a control parameter of the carriage motor 26 which drives the carriage 21, a control parameter of the paper-advance motor 24 for driving the platen 23, a control parameter for adjusting the particle size of an ink droplet ejected from the nozzle aperture of the print-head 22 and the quantity of ink of the ink droplets, and the like. Specifically, the model-specific parameters may include a paper-feeding parameter, a paper-advance parameter, and a paper-output parameter, all of which correspond to print setting information such as the type and size of paper to be subjected to printing. The printer section 11 carries out printing by use of the model-specific parameters.

The geometry and layout of mechanical portions constituting the printing device differ from one model to another. For instance, relative positions of the platen and the carriage, the relative positions of the carriage and a paper detection sensor, and the geometry of the carriage differ according to the model of the printing device. Accordingly, the paper-feeding parameter, the paper-advance parameter, and the paper-output parameter, all of which correspond to the print setting information such as the type and size of paper to the subjected to printing, are parameters compatible with the model of the printing device; namely, parameters unique to the model.

The I/F section 17 is connected to an interface circuit (omitted from the drawings) of the PC 2 by way of the USB cable 3, and controls two-way data communication with the PC 2. A printer driver 2a (FIG. 3) compatible with the printer 1 of the present embodiment is installed in the PC 2. On the basis of the print data output by way of the printer driver 2a, the printer 1 carries out printing. In the present embodiment, the printer driver 2a transmits a print command including model-specific parameters used during printing operation performed by the printer 1 or a print command including the print setting information input by the PC 2.

Figure 3:
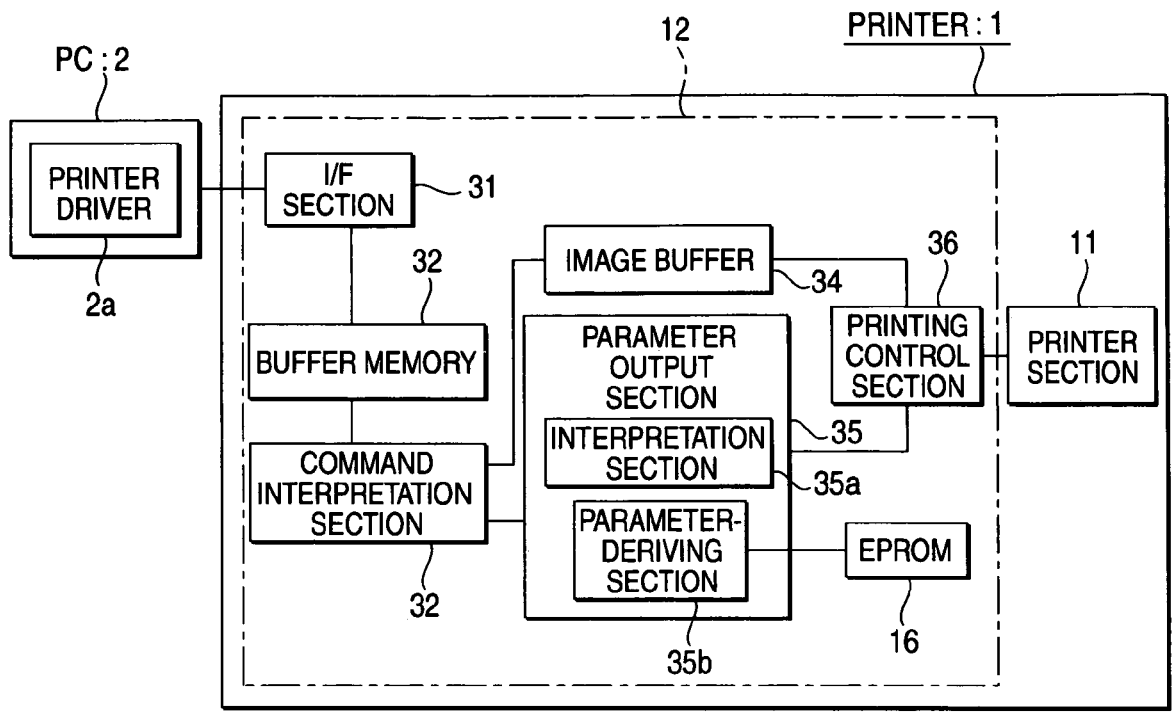
FIG. 3 is a block diagram showing a functional configuration related to parameter output processing.

The function of the CPU 13, which acts as a parameter output section, will be described in detail by reference to FIG. 3. Constituent portions which are the same as those shown in FIG. 2 are assigned the same reference numerals, and some of their detailed explanations are omitted.

The control circuit 12 of the printer 1 is provided with an I/F section 31, buffer memory 32, a command interpretation section 33, an image buffer 34, a parameter output section 35, the EEPROM 16 acting as a nonvolatile storage medium, and a print control section 36. The buffer memory 32 and the image buffer 34 are formed by utilization of a memory area of the above-described RAM 15 (FIG. 2).

The printer driver 2a incorporated in the PC 2, which acts as the control section and the print controller, performs processing for generating a print command in accordance with the print setting information input from the PC 2. Specifically, the printer driver 2a performs processing for determining whether or not the printer 1 can derive the model-specific parameters, on the basis of the predetermined information acquired from the printer 1. When the printer 1 cannot derive the model-specific parameters, the printer driver 2a performs processing for generating a print command including the model-specific parameters of the printer 1. If the printer 1 can derive the model-specific parameters, the printer driver 2a generates a print command including the print settings input by the PC 2, and transmits the thus-generated print command to the printer 1, thereby causing the printer 1 to derive the model-specific parameters.

The print command and print data supplied from the printer driver 2a of the PC 2 are temporarily stored in the buffer memory 32. The command interpretation section 33 analyzes the print command stored in the buffer memory 32, and stores the print data into the image buffer 34. The parameter output section 35 has an interpretation section 35a and a parameter-deriving section 35b. On the basis of the command interpreted by the command interpretation section 33, these sections perform various processing operations for outputting model-specific parameters. In detail, on the basis of a result of interpretation of the print command performed by the command interpretation section 33, the determination section 35a determines whether or not the print command includes model-specific parameters; namely, the determination section 35a determines whether or not the printer driver 2a is generating a print command including model-specific parameters for print data.

When the determination section 35a has determined that the print command includes the model-specific parameters, the parameter output section 35 outputs, to the print control section 36, the model-specific parameters included in the print command. When the determination section 35a has determined that the print command does not include any model-specific parameters, the parameter-deriving section 35b derives the model-specific parameters by reference to the table stored in the EEPROM 16.

Figure 8A:
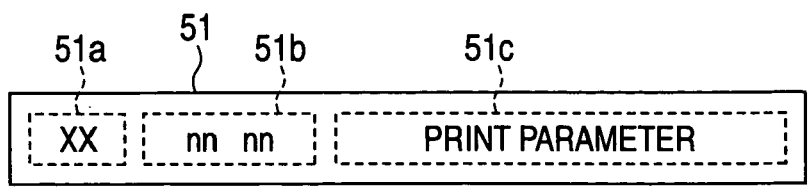
FIG. 8A to 8C are descriptive views of printer commands.

As shown in FIG. 8A, the print command 51 comprises a command name 51a, a parameter count 51b, and a print parameter 51c. The command name 51a is a unique character string of two bytes corresponding to settings of the printing device. For example, a command whose command name 51a is a character string "PP" is for setting a paper-feeding path. A command whose command name 51a is a character string "DP" is for setting double-sided printing. The parameter count 51b shows the amount of data (the number of bytes) of the print parameter 51c. The print parameter 51c corresponds to print settings or a unique numeral corresponding to the print settings. For instance, in the case of a command used for setting double-sided printing, the command whose print parameter 51c is "00" is for setting cancellation of a double-sided printing mode. A command whose print parameter 51c is "01" is for setting a shift to a double-sided printing mode.

Figure 8B:
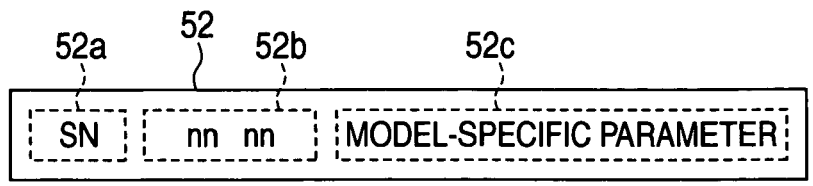

FIG. 8B shows a print command 52 for outputting a model-specific parameter to the printer 1. A character string "SN" is described in a command name 52a of this print command 52, and the number of bytes of a subsequent print parameter 52c is described in a parameter count 52b of the same command. Further, a model-specific parameter is described in the print parameter 52c of the print command 52. As mentioned above, the model-specific parameter may include a paper-feeding parameter, a paper-advance parameter, a paper-output parameter, and other parameters, all of which correspond to the print setting information, such as the type and size of paper to be subjected to printing.

Figure 8C:
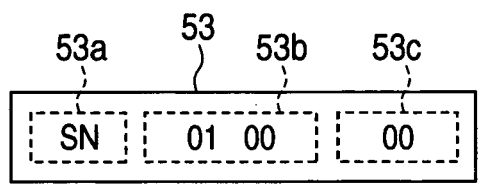

FIG. 8C shows a print command 53 for causing the printer 1 to derive a model-specific parameter. In the present embodiment, a character string "SN" is described in the command name 53a of this print command 53. The number of bytes of a subsequent print parameter 52c is described in a parameter count 53b, and a fixed numeral "00" is described in the print parameter 53c of the print command 53. Consequently, the numeral of two bytes "00, 01," which shows the number of bytes of the print parameter 53c, is described in the parameter count 53b.

The command name 53a is identical with the command name 52a of the print command 52 used for supplying a model-specific parameter to the printer 1. Specifically, the print command whose command name is a character string "SN" is for outputting a model-specific parameter from the parameter output section 35. The parameter count 53b and the print parameter 53c differ from the parameter count 52b and the print parameter 52c of the print command 52 used for supplying a model-specific parameter to the printer 1. Accordingly, the determination section 35a shown in FIG. 3 determines whether or not the print command includes model-specific parameters, by means of the parameter count and the print parameter, both of which are included in the print command whose command name is a character string "SN." The value of the parameter count 53b and the value of the print parameter 53c, both of which are included in the print command 53, may be changed as required, so long as the print command 53—which does not include a model-specific parameter—and the print command 52—which includes a model-specific parameter—can be determined.

Figure 9:
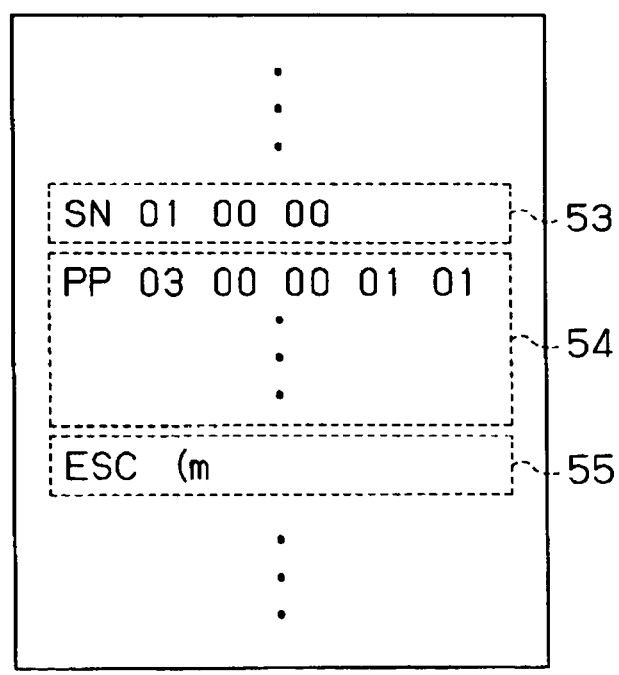
FIG. 9 is a descriptive view of a group of commands used for deriving a control constant.

As shown in FIG. 9, subsequently to the print command 53, one or a plurality of print commands 54 and a print command 55 for initiating derivation of a model-specific parameter are transmitted from the PC 2 to the printer 1. The print command 53 is for causing the printer 1 to derive a model-specific parameter. As mentioned previously, the print command 54 includes print settings. For instance, a print command whose illustrated command name is a character string "PP" is for setting a paper-feeding path, and includes print settings which are input to the PC 2 for specifying cut paper or rolled paper. The print command 55 includes ESC (an escape code) and a predetermined character string (e.g., "m"). When the print command 55 is input, the parameter-deriving section 35b derives a model-specific parameter on the basis of the print settings of the print command 54 input during a duration from the print command 53 to the print command 55 and by reference to the table stored in the EEPROM 16.

The print command 51 is for setting a corresponding printing constant (a model-specific parameter) by means of this print parameter. The print command 52 is for directly setting a control constant (a model-specific parameter). Consequently, the print command 52 enables making of settings other than initial settings or settings which cannot be set by the print command 51. For this reason, the print command 52 can be said to be an extension command for extending a setting function to the print command 51.

The print command 54 is for setting included print settings to the printer 1 as well as for deriving a model-specific parameter. Such switching operation is performed by the print command 53. Specifically, the print command 54 sets print settings in the printer 1 under normal conditions and, hence, is output from the PC 2 to the printer 1. After the print command 53 has been output, the print command 54 is output from the PC 2 to the printer 1 for outputting, to the printer 1, the print setting information used for deriving a model-specific parameter. Namely, the print command 53 can be said to be an extension command for functionally extending the ordinary print command 54 to a print command (an extended command) for deriving a model-specific parameter.

Figure 4:
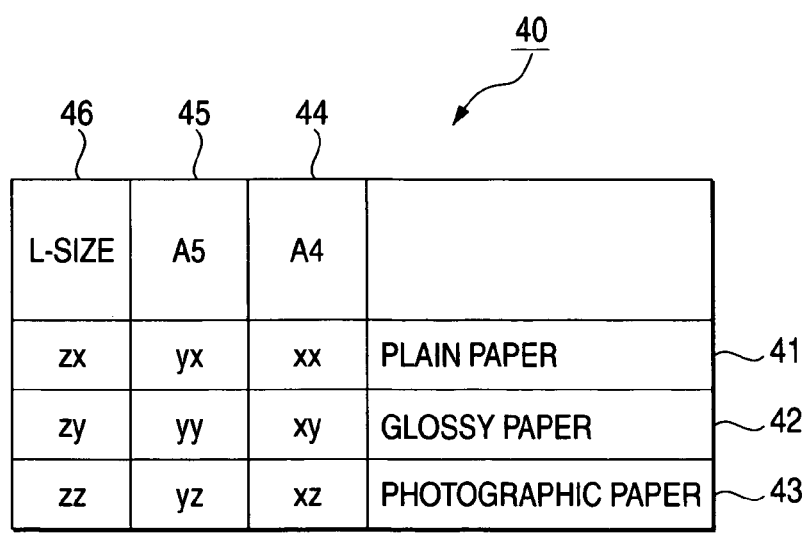
FIG. 4 is a descriptive view for describing an example table.

The EEPROM 16 stores, e.g., a table 40 such as that shown in FIG. 4. A model-specific parameter is set in the table 40 in association with a combination of the type of paper and a print size, which correspond to print setting information to be selected by the user by way of the PC 2. Specifically, types of paper; plain paper 41, glossy paper 42, and photographic paper 43, and paper sizes: A4-size 44, A5-size 44, and L-size 46, are combined together. As illustrated, model-specific parameter values, such as "xx" or "zy," are set for the respective combinations. For instance, when the type of paper "glossy paper" and a paper size "A4" are input as print setting information, the parameter-deriving section 35b derives "xy" as a model-specific parameter by reference to the table 40.

Values of the model-specific parameters derived on the basis of the print setting information are set so as to become values optimal for the print setting information. For example, a model-specific parameter is set so as to change the amount of paper transported, in accordance with the type of paper to be subjected to printing. The reason for this is that, even when the paper-feeding motor 24 is driven according to the degree of slippage of the surface of paper, an actual extent of shift of the paper laid on the platen 23 changes. Specifically, in the case of the type of paper having a smooth surface, such as glossy paper, paper is efficiently transported in a transporting direction. Accordingly, the model-specific parameter compatible with the type of paper is set such that a transport distance is reduced as the type of paper is comparatively easy to slip, and such that a transport distance becomes greater as paper is comparatively difficult to slip.

For instance, the model-specific parameter is set such that the size and quantity of ink droplets ejected from the print head 22 are adjusted according to a print resolution. Specifically, when the resolution is high, ink droplets ejected from the print head 22 become smaller. Hence, there may arise a case where the ink droplets fail to arrive at paper and waft through the air as mist. As a result, ink droplets fail to arrive at appropriate positions on paper, whereby a printed image becomes blurred. In order to prevent this problem, the model-specific parameter is controlled and set such that ink droplets to be ejected to both ends of paper, where mist is particularly likely to arise, become comparatively larger, thereby preventing occurrence of mist and producing a high-resolution printed image which is prevented from becoming blurred.

For instance, the model-specific parameter is set such that the amount of paper feed, which is effected by the platen 23 during paper feeding operation or paper output operation, is adjusted on the basis of whether paper is a cutform such as a cut sheet or long paper such as rolled paper. When paper corresponds to cut sheets, paper is not fed well during paper-feeding operation, thereby resulting in occurrence of print irregularities in an upper end portion of paper. Alternatively, when the paper having undergone printing is output, a printed surface side of paper is not pressed well, to thus come out of contact with the platen 23. This may give rise to a case where irregularities arise in a lower end portion of paper. For this reason, occurrence of such irregularities can be prevented by adjusting a paper-feeding parameter and a paper-output parameter as a model-specific parameter.

As mentioned above, even when the print data to be subjected to printing are not input along with a model-specific parameter used for controlling the print data, the parameter output section 35 of the printer 1 can derive a model-specific parameter suitable for use with the printer 1, so long as the print setting information is input. Even when a printer driver compatible with the printer 1 is not incorporated in the host device, or when the model-specific parameter compatible with the printer 1 cannot be received from the printer driver 2a as a result of settings of the printer 1 having been changed, a model-specific parameter suitable for the printer 1 can be acquired. Therefore, in a situation where the host machine is a portable terminal having a comparatively small amount of memory, when the printer driver compatible with the printer 1 is not incorporated in the portable terminal, a model-specific parameter can be derived by receiving from the portable terminal the print data and predetermined print setting information (e.g., in the present embodiment the print setting information included in the table 40).

As in the case of the PC 2 of the present embodiment, even in a case where the printer driver 2a compatible with the printer 1 is incorporated, the PC 2 can be configured to generate the print command including the model-specific parameter unless the print setting information assigned to the printer 1 is input.

Next, the printing operation performed by the printer 1 will now be described by reference to FIG. 5.

First, when the printer driver 2a of the PC 2 has inquired about the model name of the printer 1, the printer 1 provides a model name thereof to the printer driver 2a. In step 100, the printer driver 2a stores the model name in memory.

In step 101, the user sets a print type, a paper size, and a print resolution in the printer driver 2a. When data to be printed are specified in step 102 and a print command is issued in step 102, the printer driver 2a determines, in step 103, whether or not a printer of the stored model name has table data corresponding to the input print setting information. In the present embodiment, a determination is made as to whether or not the input print setting information is included in the table 30 stored in the EEPROM 16.

Here, the printer driver 2a can determine whether or not the printer 1 can derive the model-specific parameter with regard to the input print setting information, by means of ascertaining the contents of the EEPROM 16 of the printer 1. Specifically, the input print setting information corresponds to predetermined information.

If the printer 1 has a table corresponding to the print setting information (YES in step 103), the printer driver 2a generates, in step 104, a print command which includes the print setting information input to the PC 2, such as a paper type or paper size. If the printer 1 does not have any table compatible with the print setting information (NO in step 103), the printer driver 2a generates a print command including a model-specific parameter in step 105.

Figure 6:
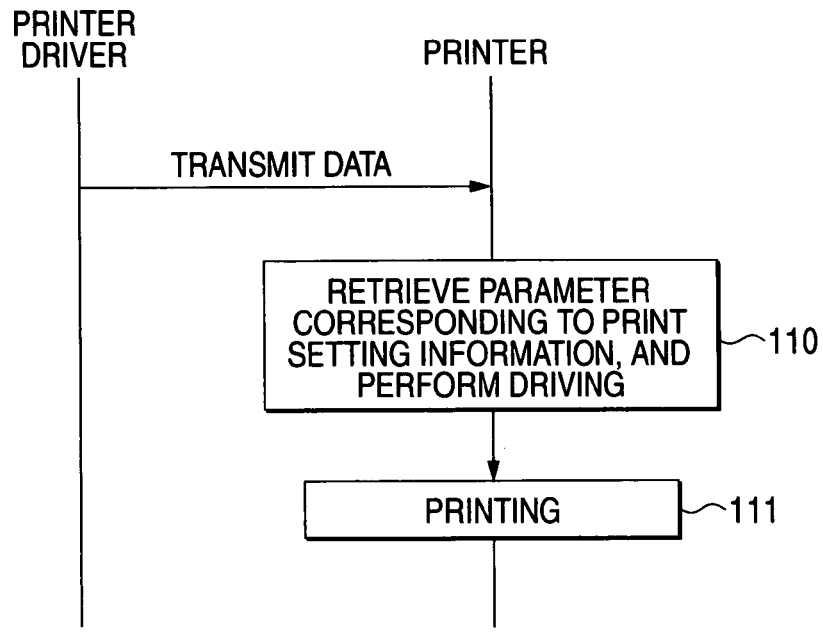
FIG. 6 is a timing chart showing the processing performed between the PC and the printer.

The printer driver 2a transmits the print data to the printer 1 in conjunction with the print command generated in step 104 or step 105. As shown in FIG. 6, when the print command has been generated in step 104, the printer driver 2a transmits to the printer 1 a print command including print setting information, such as a paper type or a paper size, along with the print data. In step 110, the printer 1 retrieves and derives the model-specific parameter corresponding to the print setting information on the basis of the print setting information (a print command) received by the printer driver 2a, and drives the printer section 11. The printer 1 performs printing in step 111.

Figure 5:
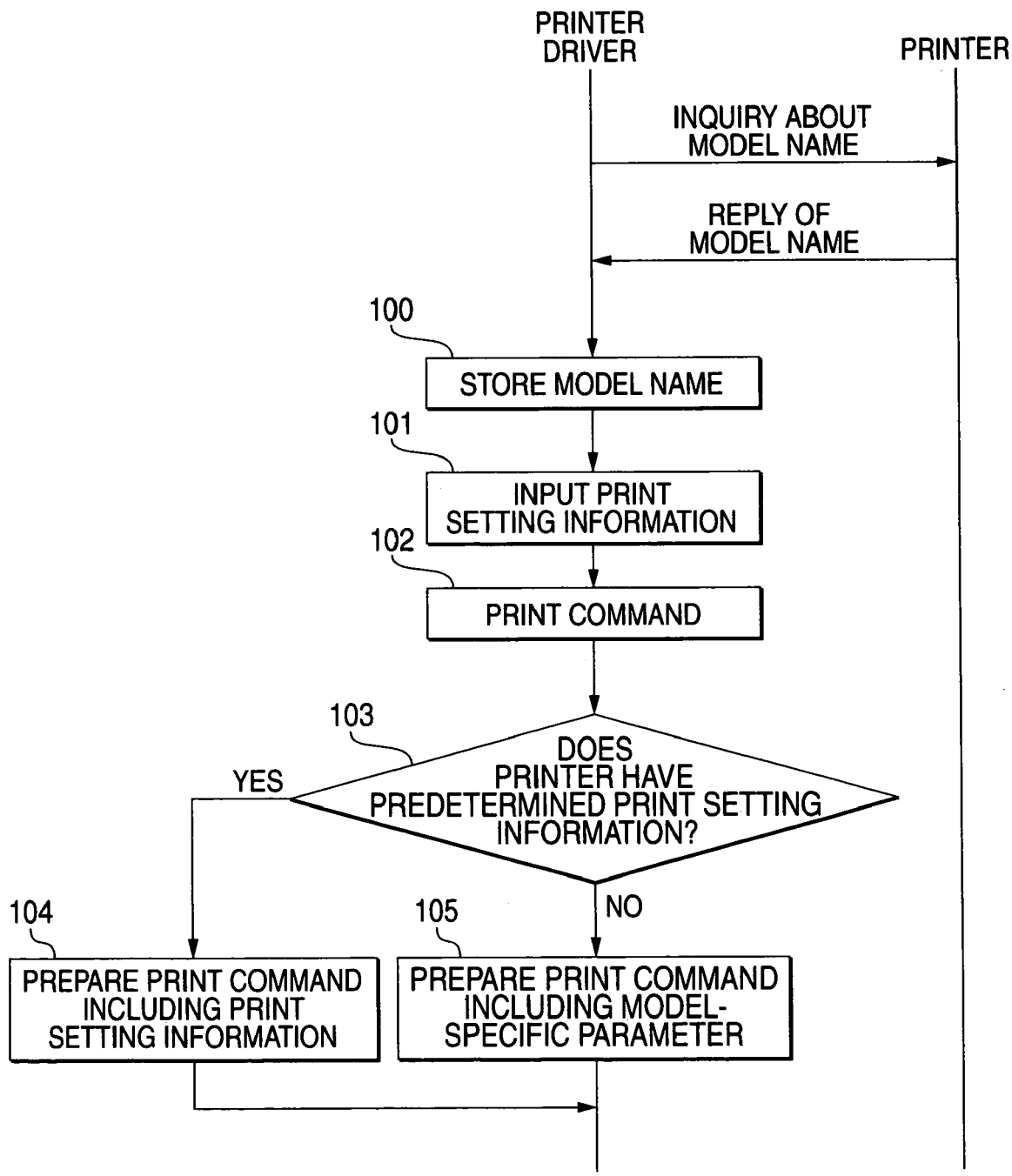
FIG. 5 is a timing chart showing the processing performed between the PC and the printer.
Figure 7:
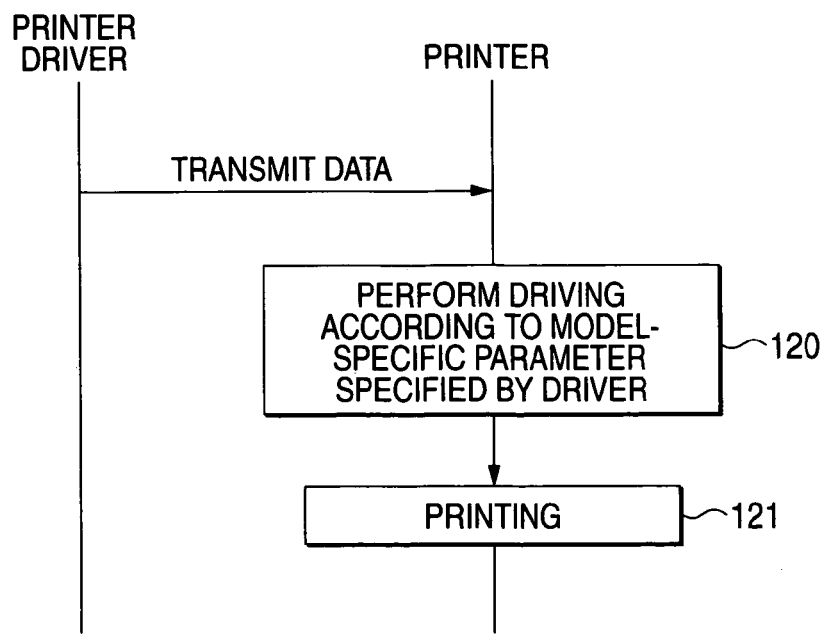
FIG. 7 is a timing chart showing the processing performed between the PC and the printer.

As shown in FIG. 7, when the print command is generated in step 105 shown in FIG. 5, the printer driver 2a transmits to the printer 1 the print command including a model-specific parameter along with the print data. In step 120, the printer 1 drives the printer section 11 on the basis of the model-specific parameter (print command) received by the printer driver 2a, and in step 121 the printer performs printing.

When the user has changed the print setting information, such as a paper type and a paper size, in the PC 2, the printer driver 2a can also perform processing for determining whether or not the changed print setting information corresponds to the table 40. In this case, processing subsequent to step 103 is performed. The essential requirement for the printer driver 2a is to perform this processing only when the print setting information (a paper type and a paper size) pertaining to the table 40 used for deriving a model-specific parameter has been changed. It may also be possible to determine, as predetermined information by reference to a model name, whether or not the printer 1 is of a model capable of deriving a model-specific parameter with regard to predetermined print setting information rather than determining whether or not the printer can derive a model-specific parameter by reference to the predetermined print setting information.

The above-described embodiment yields the following advantages:

(1) On the basis of the print setting information input by the PC 2, such as a paper type and a paper size, the printer 1 can derive a model-specific parameter used for controlling driving of the printer section 11. Therefore, the printer 1 can enhance general versatility of the driver.

Second Embodiment

A second embodiment of the present invention will be described hereinbelow by reference to the drawings.

First, there will be described a diagrammatic configuration of an inkjet recorder, which is an example of the "recorder" of the present invention.

Figure 10:
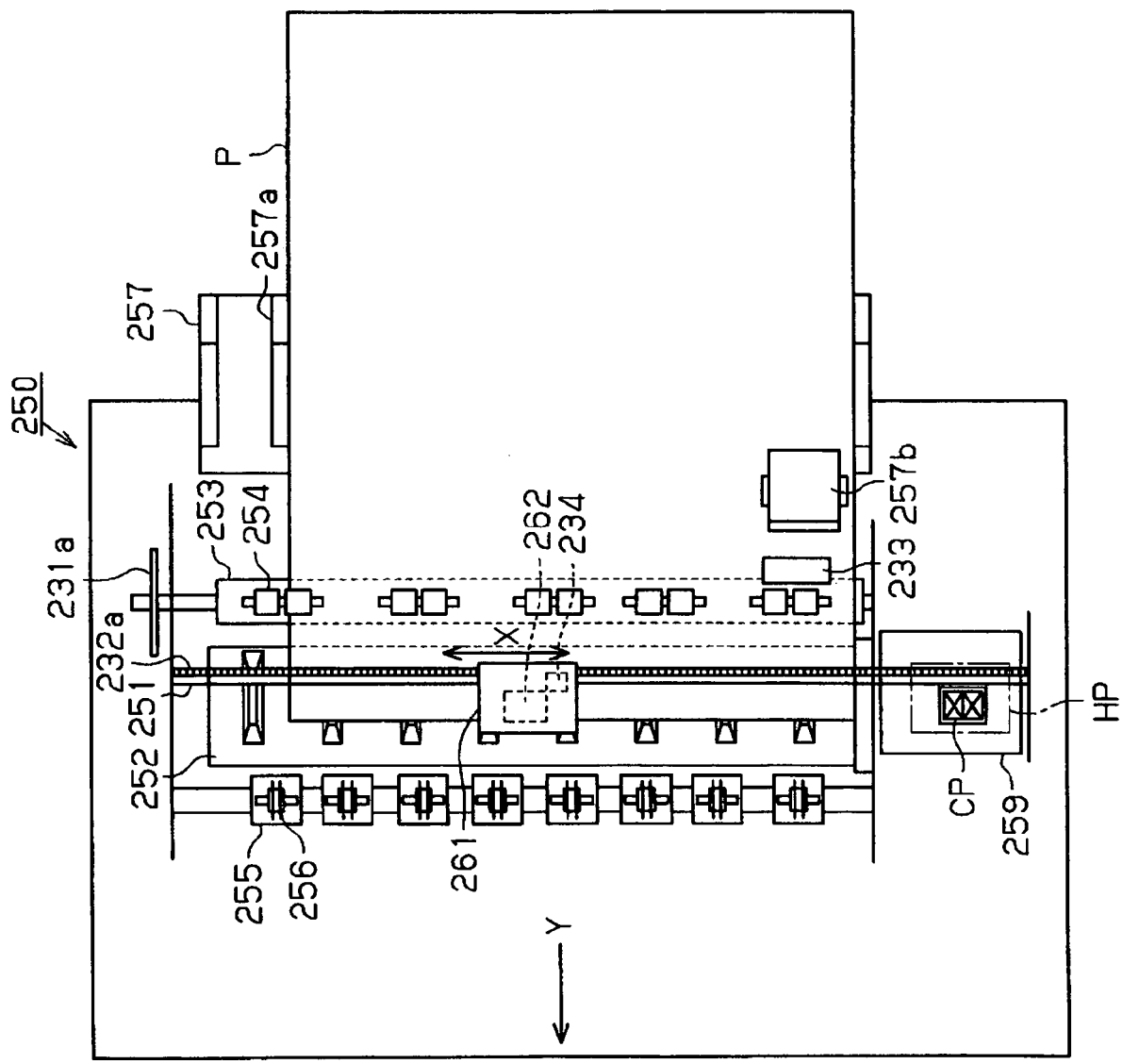
FIG. 10 is a diagrammatic plan view of an inkjet recorder.
Figure 11:
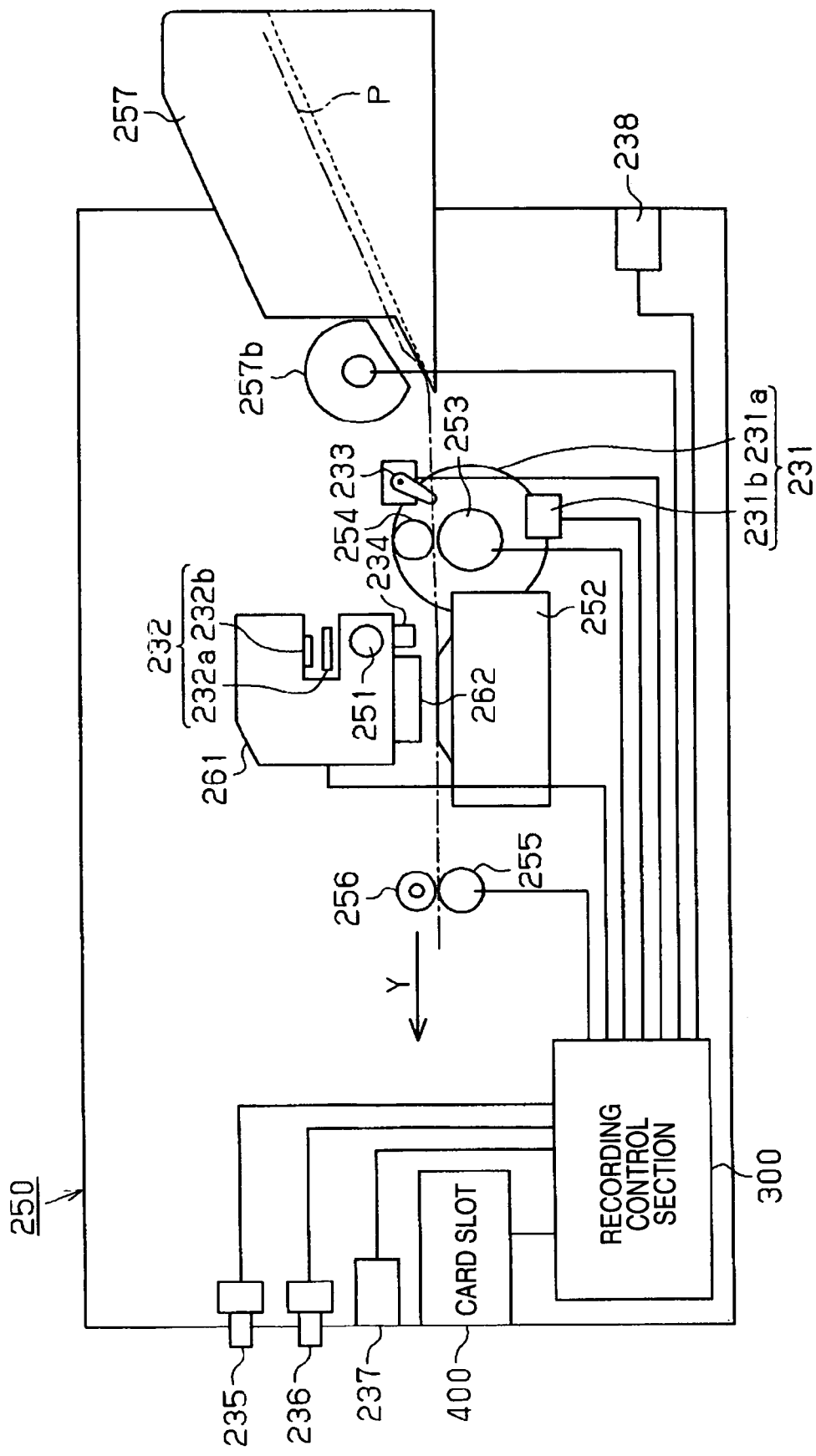
FIG. 11 is a diagrammatic side view of the inkjet recorder.
Figure 12:
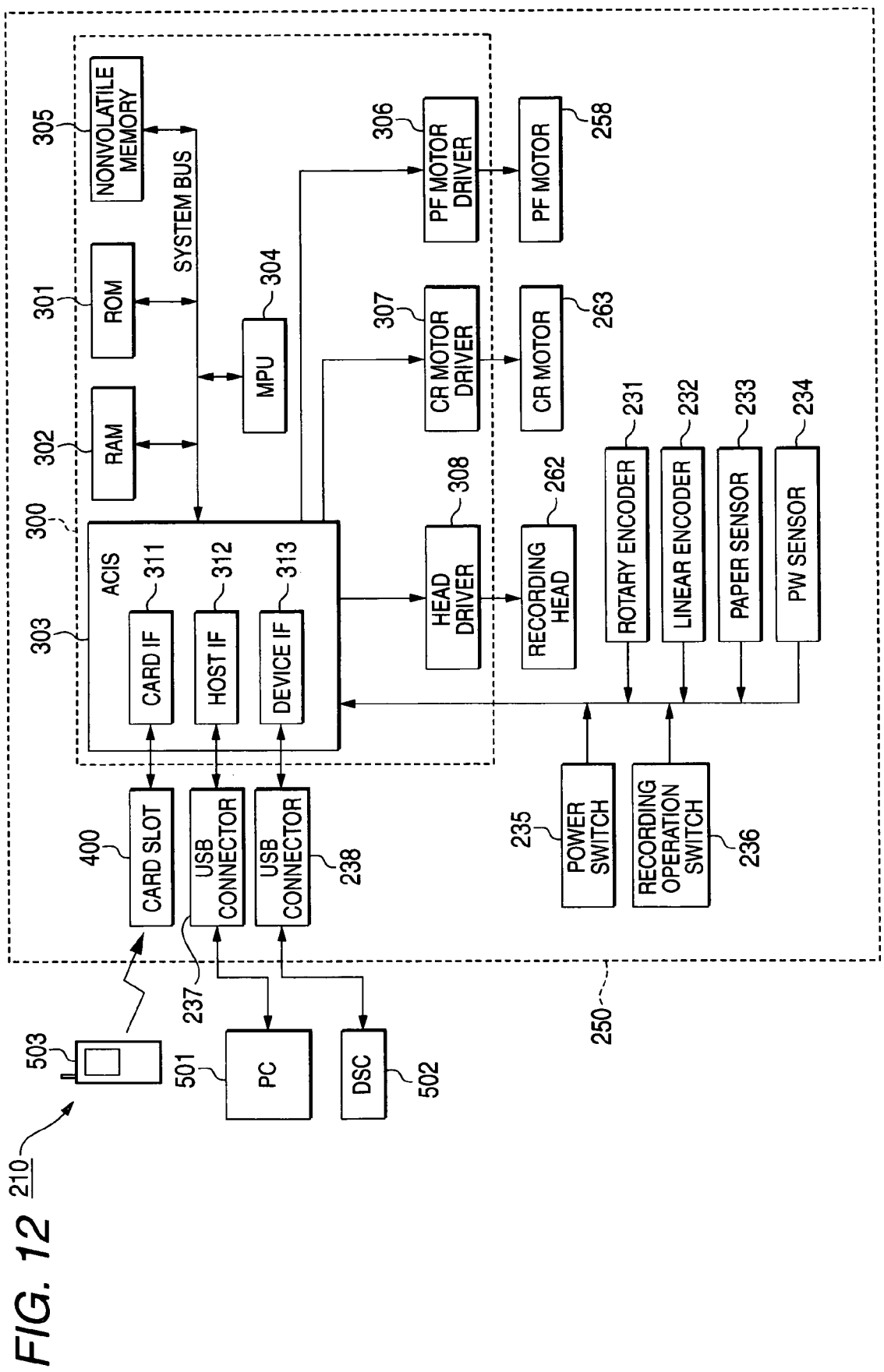
FIG. 12 is a diagrammatic block diagram of a recording system.

FIG. 10 is a plan view of the principal section of an inkjet recorder of the present invention. FIG. 11 is a side view. FIG. 12 is a schematic block diagram of a recording system of the present invention.

In an inkjet recorder 250, a carriage 261 is supported by a carriage guide shaft 251 so as to be movable in a main-scanning direction X, as "main scan drive means" for causing a recording head 262—which performs recording by ejecting ink to recording paper P used as a "recording material"—to scan in the main-scanning direction X with respect to the recording paper P. The carriage 261 is equipped with the recording head 262 and a PW sensor 234 to be described later. Rotational drive force of a CR motor 263 (FIG. 12) is transmitted by means of an unillustrated belt transmission mechanism, whereby the carriage 261 is reciprocally moved in the main-scanning direction X. A platen 252 for defining a gap between a head face of the recording head 262 and recording paper P is disposed at a position opposing the head face of the recording head 262.

A known ink system 259 is disposed outside of one end of the reciprocally-movable area of the carriage 261 in the main-scanning direction X. In a standby condition where recording is not performed, the carriage 261 moves to and stops at a position above the ink system 259. The head face of the recording head 262 is sealed with a cap CP provided on the ink system 259. The position where the carriage 261 is stopped is defined as a home position HP.

The inkjet recorder 250 is provided with, as "sub-scan driving means" for causing the recording head 262 to scan in a sub-scanning direction Y with respect to the recording paper P, a transport drive roller 253 for transporting the recording paper P in the sub-scanning direction Y and a transport follower roller 254. When the rotational drive force of a PF motor 258 (FIG. 12) is transmitted to the transport drive roller 253 via gears, the transport drive roller 253 is rotated, and the recording paper P is transported in the sub-scanning direction Y by means of rotation of the transport drive roller 253. The transport follower roller 254 is provided in a number greater than one. When the respective transport follower rollers 254 are driven by the transport drive roller 253 and the recording paper P is transported by rotation of the transport drive roller 253, the transport follower rollers 254 follow rotation of the recording paper P while remaining in contact with the same, to thus rotate. A coating having high frictional resistance is applied over an outer peripheral surface of the transport drive roller 253. The recording paper P pressed against the outer peripheral surface of the transport drive roller 253 by the transport follower rollers 254 comes into intimate contact with the outer peripheral surface of the transport drive roller 253 by frictional resistance of the outer peripheral surface of the same, and is transported in the sub-scanning direction by means of rotation of the transport drive roller 253. "Recording execution means" of the inkjet recorder 250 is formed from the above-described "main scan drive means" and the "sub-scan drive means." The recording paper P is subjected to recording by means of alternating repetition of operation for transporting, at a predetermined feed rate, the recording paper P between the carriage 261 and the platen 252 in the sub-scanning direction Y, and operation for ejecting ink to the recording paper P from the recording head 262 during a round trip of the recording head 262 in the main-scanning direction X.

A paper-feeding tray 257 serving as "recording material stacking means" capable of stacking a plurality of sheets of recording paper P is disposed upstream of the transport drive roller 253 in the sub-scanning direction Y. The paper-feeding tray 257 is configured to be able to feed (transport) the recording paper P; e.g., plain paper or photographic paper. An automatic sheet feeder (ASF) employed as "automatic feeding means"—which automatically feeds to "recording execution means" the topmost sheet of the recording paper P stacked on the paper-feeding tray 257—is disposed in the vicinity of the paper-feeding tray 257. The ASF is an automatic paper-feeding mechanism which has a paper-feeding roller 257b provided on the paper-feeding tray 257, and an unillustrated separation pad. The paper-feeding roller 257b is provided on one side of the paper-feeding tray 257. A recording paper guide 257a is provided on the paper-feeding tray 257 and can slidably move in a widthwise direction so as to be aligned with the width of the recording paper P. When the recording paper P laid on the paper-feeding tray 257 is fed by means of the rotational drive force of the paper-feeding roller 257b— which rotates as a result of transmission of rotational drive force of the PF motor 258 (FIG. 12) via gears—as well as frictional resistance of the separation pad, only the topmost sheet of recording paper P is accurately separated and automatically fed one sheet as a time without the plurality of sheets of recording paper P being fed simultaneously. A paper sensor 233 based on a known technique is interposed between the paper-feeding roller 257b and the transport drive roller 253.

A paper-output drive roller 255, which acts as an "output drive roller," and paper-output follower rollers 256 are provided as means for outputting the recording paper P having undergone recording. The rotational drive force of the PF motor 258 (FIG. 12) is transmitted to the paper-output drive roller 255 via gears, so that the paper-output drive roller 255 rotates. B means of rotation of the paper-output roller 255, the recording paper P having undergone recording is output in the sub-scanning direction Y. The paper-output follower roller 256 is configured as a pointed toothed roller, wherein a plurality of teeth are provided around the roller and tip ends of the respective teeth come into point contact with a recording face of the recording paper P. The plurality of paper-output follower rollers 256 are respectively driven by the paper-output drive roller 255. When the recording paper P is output by rotation of the paper-output drive roller 255, the paper-output follower rollers 256 contact the recording paper P to follow the output action of the recording paper P, thereby making a rotation.

A recording control section 300, which will be described later, drives and controls the PF motor 258 (FIG. 12)—which rotationally drives the paper-output roller 257b, the transport drive roller 253, and the paper-output drive roller 255—and the CR motor 263 (FIG. 12) for driving the carriage 261 in the main scanning direction. Likewise, the recording head 262 is also driven and controlled by the recording control section 300, thereby ejecting ink on the surface of the recording paper P.

The recording control section 300, which acts as a "recording controller," will now be described by reference to FIGS. 10 to 12.

The recording control section 300 acting as a "recording controller" comprises ROM 301, RAM 302, an ASIC (application-specific integrated circuit) 303, an MPU 304, nonvolatile memory 305 employed as a "nonvolatile storage medium," a PF motor driver 306, a CR motor driver 307, and a head driver 308. The MPU 304 receives a signal output from a rotary encoder 231 which serves as "amount-of-rotation detection means" for detecting the amount of rotation of the transport drive roller 253 by way of the ASIC 303, a signal output from a linear encoder 232 employed as "carriage travel distance detection means" for detecting the travel distance of the carriage 261, a signal output from the paper sensor 233 for detecting leading and trailing edges of the transported recording paper P, a signal output from the PW sensor 234 for detecting an edge of the recording paper P in the main-scanning direction X, a signal output from a power switch 235 for activating/deactivating the power of the inkjet recorder 250, and a signal output from a recording operation switch 236 used for starting operation for subjecting the recording paper P to recording operation performed by the "recording execution means."

The known rotary encoder 231 has a rotary scale encoder 231a (FIG. 11) which rotates in synchronism with the transport drive roller 253, and a rotary scale sensor 231b for detecting slits formed at uniform intervals in an outer periphery of a rotary scale 231a. A signal which is output from the rotary scale sensor 231b and changes in association with rotation of the transport drive roller 253 is delivered to the MPU 304 by way of the ASIC 303.

The known linear encoder 232 has a linear scale 232a disposed in the vicinity of the carriage 261 essentially parallel to the main scanning direction, and a linear scale sensor 232b (FIG. 11) for detecting slits formed, at uniform intervals, in the linear scale 232a provided on the carriage 261. A signal which is output from the linear scale sensor 232b and changes in association with movement of the carriage 261 in the main scanning direction X is delivered to the MPU 304 by way of the ASIC 303.

The known paper sensor 233 is a sensor (FIG. 11) imparted with a characteristic of restoring its attitude to a standing position. Moreover, the sensor has a lever which is pivotally supported and projects in the transport path of the recording paper P so as to be able to pivot solely in a transporting direction (the sub-scanning direction Y) of the recording paper P. As a result of the tip end of the lever being pressed against the recording paper P, the lever is pivoted, whereby the recording paper P is detected. The paper sensor 233 detects the start and end positions of the recording paper P fed by the paper-feeding roller 257b, and a detection signal is output from the paper sensor to the MPU 304 by way of the ASIC 303. The PW sensor 234 is formed from a non-contact optical sensor, and detects end positions of the recording paper P in the main-scanning direction X (positions of side edges of the recording paper P). A resultant detection signal is output to the MPU 304 by way of the ASIC 303. The transported position of the recording paper P, the size of the same, and the like, are computed by the MPU 304 on the basis of the signals output from the paper sensor 233 and the PW sensor 234.

A system bus of the recording control section 300 is connected to ROM 301, RAM 302, an ASIC 303, MPU 304, and the nonvolatile memory 305. The MPU 304 performs computing operation for performing recording and controlling of the inkjet recorder 250, or other required computing operations. A recording control program (firmware) required by the MPU 304 to control the inkjet recorder 250 is stored in the ROM 301. Various types of data required to process a recording control program are stored in the nonvolatile memory 305. The RAM 302 is used as a work area of the MPU 304 or a primary storage area for recording data or the like.

The ASIC 303 has a control circuit for controlling the speed of the PF motor 258 and that of the CR motor 263, both motors being DC motors, as well as for driving and controlling the recording head 262. On the basis of a control command sent from the MPU 304, the signal output from the rotary encoder 231, or a signal output from the linear encoder 232, various computing operations for controlling the speed of the PF motor 258 and that of the CR motor 263 are performed, and a motor control signal based on the result of computation is sent to the PF motor driver 306 and the CR motor driver 307. Moreover, on the basis of the recording data, or the like, sent from the MPU 304, a control signal for the recording head 262 is generated through arithmetic operation, and the thus-generated signal is sent to the head driver 308, thereby driving and controlling the recording head 262.

The ASIC 303 has a card IF 311, a host IF 312, and a device IF 313 serving as "information transmission means," all of which realize transmission of information between a personal computer 501, which is employed as an "information processor," and a digital camera 502 or a portable cellular phone 503.

The card IF 311 embodies a card interface with a memory card or a PC card, which is inserted into a card slot 400. When a memory card is inserted into the card slot 400, reading or writing of data from or into the memory card is enabled. When an infrared-radiation communication interface card is inserted into the card slot 400, an infrared-radiation communications interface with an electronic device having an infrared-radiation communication function, such as the portable cellular phone 503, is materialized.

The host IF 312 realizes a USB interface with a host machine, such as the personal computer (PC) 501 to be connected to a USB connector 237 used for connection with a host machine. The USB connector 237 is provided in the back of the inkjet recorder 250 (FIG. 11).

The device IF 313 embodies a USB interface with a USB device, such as the digital camera (DSC) 502 to be connected to a USB connector 238 used for connection with a device. The USB connector 238 is provided in the front of the inkjet recorder 250 so that removal and attachment of a USB device, such as the digital camera 502, can be readily performed (FIG. 11).

The recording system 210 of the present invention will now be described.

FIGS. 13 to 16 are schematic data flows of the recording system 210.

Figure 13:
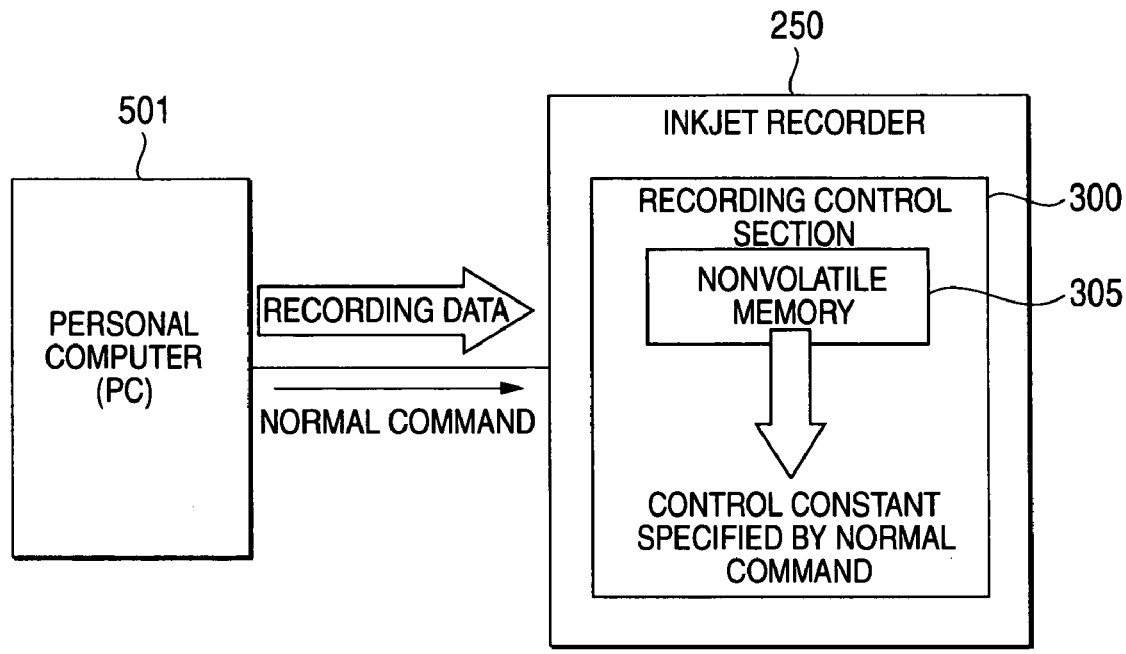
FIG. 13 is a diagrammatic data flow of the recording system.
Figure 14:
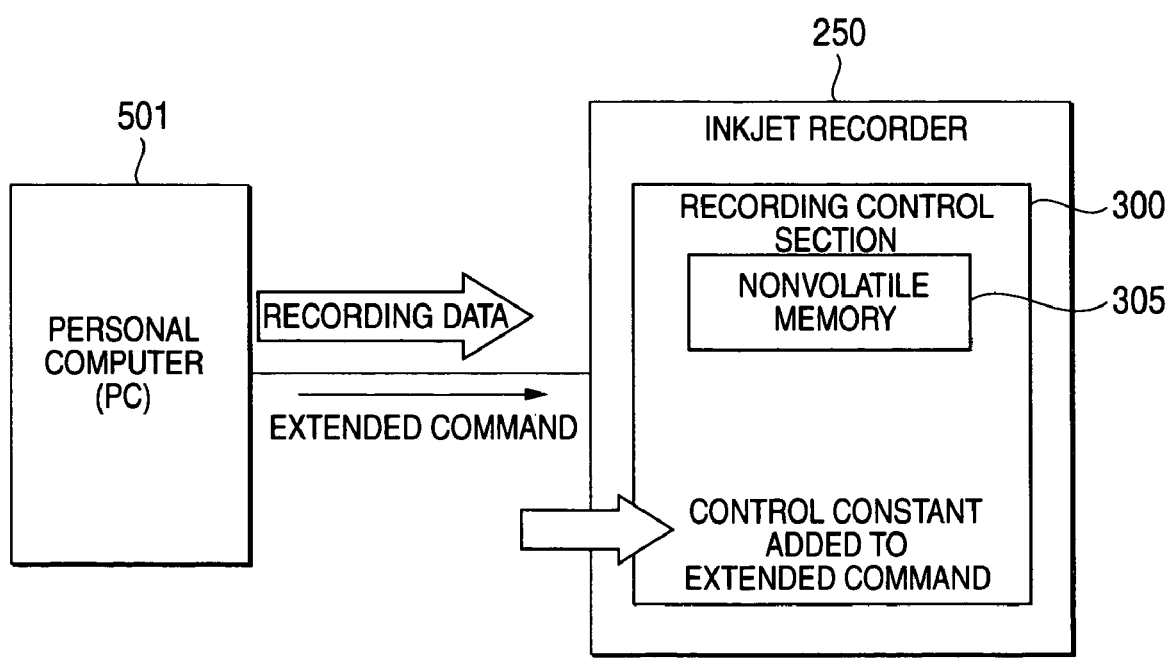
FIG. 14 is a diagrammatic data flow of the recording system.

FIGS. 13 and 14 are schematic data flows acquired when the personal computer 501 and the inkjet recorder 250 are connected together so as to be able to transmit information.

The personal computer 501 enables the user to perform operation for arbitrarily specifying from among image data which are stored in a built in hard disk (not shown) and can be input, image data to be recorded on the recording paper P by means of the inkjet recorder 250; operation for arbitrarily setting the type of the recording paper P; and operation for recording specified image data, by means of operating a keyboard or a mouse (not shown) while viewing a display screen or the like (not shown). In a state where the personal computer 501 and the inkjet recorder 250 are connected together by way of a known USB interface so as to be able to transmit information (FIGS. 13 and 14), the personal computer 501 selectively determines, by use of two types of commands (a normal command and an extended command) used for specifying a control constant for use in recording data on the recording paper P, whether to perform recording by prioritized use of the control constant previously stored in the nonvolatile memory 305 of the inkjet recorder 250 or by prioritized use of the control constant of the personal computer 501.

In a case where operation for recording the specified image data has been performed while the type of the recording paper P compatible with the inkjet recorder 250 is set, the personal computer 501 transmits to the inkjet recorder 250 the normal command assigned to the type of the recording paper P and the recording data generated from the specified image data. When having received the normal command from the personal computer 501, which acts as a host machine, along with the recording data, the recording control section 300 of the inkjet recorder 250 selects, in a prioritized manner, the control constant specified by the normal command among the plurality of control constants stored in the nonvolatile memory 305, and records the recording data received on the basis of the selected control constant (FIG. 13).

When operation for recording the specified image data has been performed while the type of the recording paper P, which is not compatible with the inkjet recorder 250, is set, the personal computer 501 transmits to the inkjet recorder 250 the extended command additionally provided with the control constant compatible with the type of recording paper P and the recording data generated from the thus-specified image data. When the extended command has been received from the personal computer 501 along with recording data, the recording control section 300 of the inkjet recorder 250 selects in a prioritized manner the control constant added to the extended command, and the recording data, which have been received on the basis of the selected control constant, are recorded (FIG. 14).

As mentioned above, a control constant can be flexibly selected to thus perform recording operation depending on whether or not the inkjet recorder 250 is compatible with the type of the recording paper P to be subjected to recording. Accordingly, high-quality recording flexibly compatible with the type of the recording paper P can be realized. For instance, when new recording paper P having a new property has been released after manufacture and sale of the inkjet recorder 250, the control constant table, or the like, is upgraded by making the printer driver installed in the personal computer 501 compatible with the new recording paper P. Thereby, recording can be carried out by transmitting the control constant compatible with the new recording paper P from the personal computer 501, and hence the new recording paper P can be subjected to high-quality recording.

Moreover, when the control constant added to the extended command received from the personal computer 501 is a portion of the control constants required for effecting recording operation, remaining required control constants are selected from the plurality of control constants stored in the nonvolatile memory 305 on the basis of the extended command. Since some of the control constants required for recording can be transmitted from the personal computer 501, the number of variations used for selecting a control constant can be increased. For instance, during an evaluation test for the inkjet recorder 250, the operation, which is performed when the control constants stored in the nonvolatile memory 305 of the inkjet recorder 250 are individually tuned while operation is being ascertained, can be carried out more readily.

Figure 15:
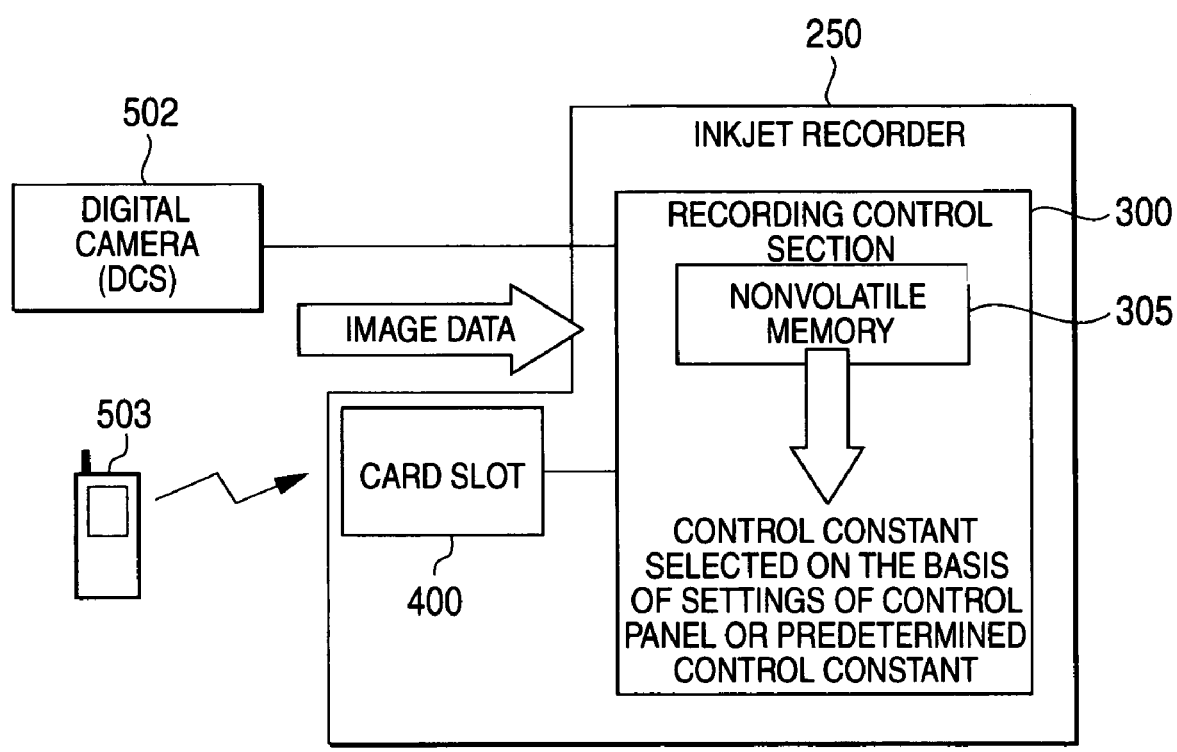
FIG. 15 is a diagrammatic data flow of the recording system.
Figure 16:
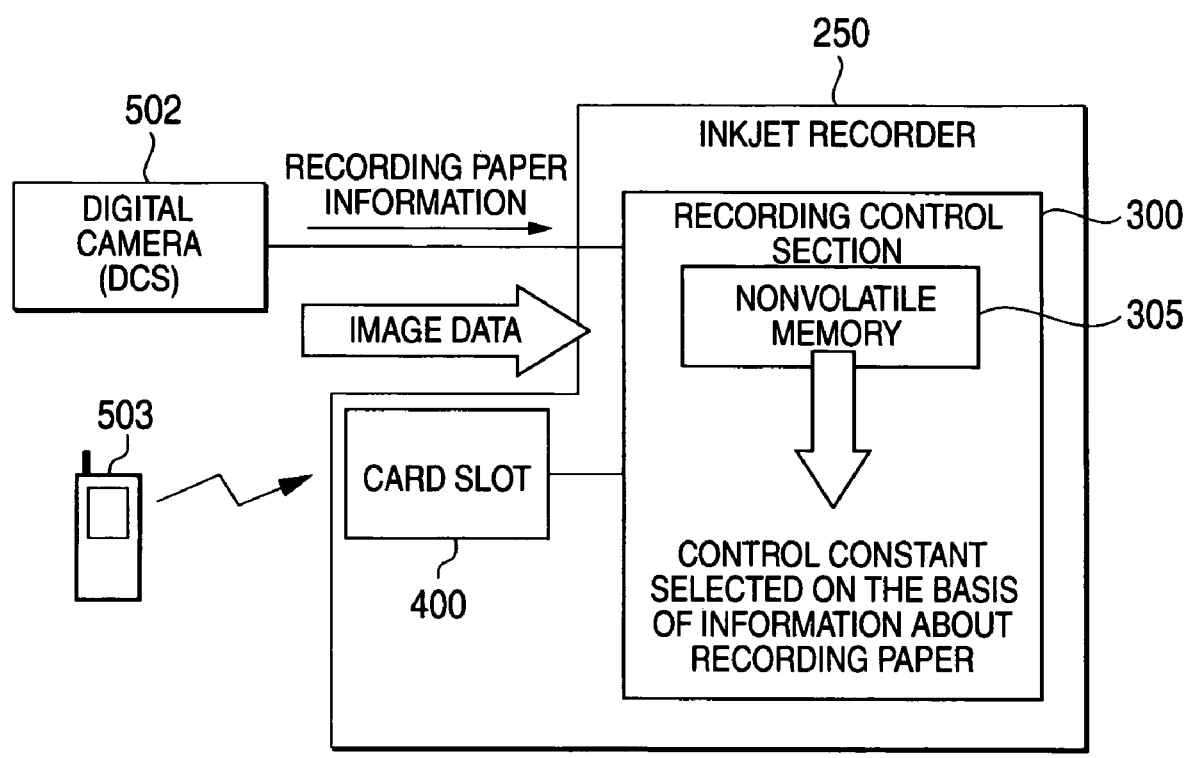
FIG. 16 is a diagrammatic data flow of the recording system.

FIGS. 15 and 16 are schematic data flows acquired when the digital camera 502 and the inkjet recorder 250 are connected together so as to be able to transmit information.

When connected to the information processor, which is employed as a device, such as the digital camera 502 or the portable cellular phone 503 so as to be able to transmit information, the inkjet recorder 250 internally generates recording data from the image data transmitted from the digital camera 502 or the portable cellular phone 503 and records the thus-generated recording data. Moreover, in a standalone state where the personal computer 501 is not connected to the inkjet recorder, such as the previously-described direct-printing state, recording data are internally generated from image data read from a memory card, or the like, inserted into the card slot 400, and the thus-generated recording data are recorded (FIGS. 15 and 16).

When only the image data are received from the digital camera 502 or the portable cellular phone 503 or when the image data are read from the memory card of the card slot 400, a plurality of control constants having already been stored in the nonvolatile memory 305 are used. Accordingly, control constants compatible with a wide variety of types of recording paper P are selected from the plurality of control constants stored in the nonvolatile memory 305, on the basis of the type of the recording paper P set by way of a control panel, or the like, (not shown) of the inkjet recorder 250, and recording can be carried out (FIG. 15).

When the type of the recording paper P has not been set by way of the control panel or the like, the control constant set to a predetermined control constant from among the control constants stored in the nonvolatile memory 305 is read from the nonvolatile memory 305. On the basis of the thus-read, predetermined control constant, the recording data generated from the received image data and recorded (FIG. 15).

When the recording paper information (information about the type and size of the recording paper P) has been received as "recording material type information" along with the image data, the control constant, which has been selected from the control constants stored in the nonvolatile memory 305 on the basis of the received recording paper information, is read. The recording data generated from the received image data are recorded on the basis of the thus-read control constant (FIG. 16). The inkjet recorder 250 can perform recording by flexibly selecting one from the control constants compatible with the plurality of types of recording paper P, so that higher-quality recording can be realized.

Subsequently, recording control procedures of the recording control section 300 will be described.

Figure 17:
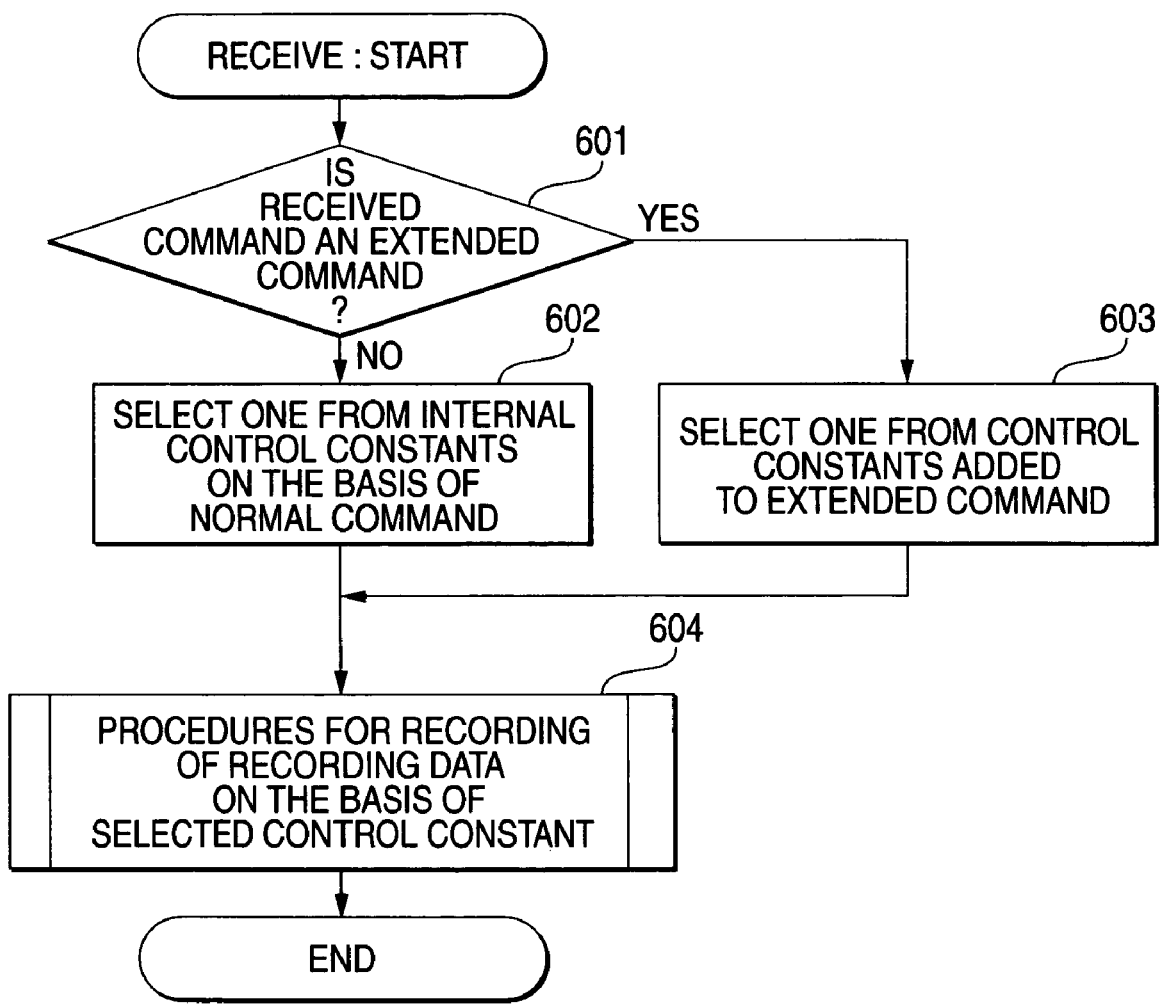
FIG. 17 is a flowchart required when a command and recording data are received.

FIG. 17 is a flowchart showing procedures performed when a command and recording data are received from the host machine (the personal computer 501 or the like).

A determination is made as to whether or not the received command is an extended command (step 601). When the received command is not an extended command; namely, when the received command is a normal command (when No is selected in step 601), a control constant is selected from the internal control constants (the control constants stored in the nonvolatile memory 305) on the basis of the normal command (step 602). Meanwhile, when the received command is an extended command (when Yes is selected in step 601), the control constant added to the received extended command is acquired and selected (step 603). On the basis of the selected control constant, the recording data having been received along with the command are recorded (step 604).

FIG. 18 is a flowchart showing procedures performed when image data are received from a device (the digital camera 502, the portable cellular phone 503, the card slot 400, or the like).

First, a determination is made as to whether or not the recording paper information has been received along with the image data (step 611). When the recording paper information has not been received (when No is selected in step 611), a determination is made as to whether or not the type of the recording paper P, or the like, has been set by way of the control panel (not shown) of the inkjet recorder 250 (step 612). When the effective type of the recording paper P, or the like, is set (when Yes is selected in step 612), a control constant is selected from the internal control constants (the control constants in the nonvolatile memory 305) on the basis of the set type of the recording paper P (step 618). When the effective type of the recording paper P, or the like, is not set (when No is selected in step 612), a predetermined control constant is selected from the internal control constants (the control constants in the nonvolatile memory 306) (step 614).

When the recording paper information has been received (when Yes is selected in step 611), the control constant is selected from the internal control constants (the control constants in the nonvolatile memory 305) on the basis of the received recording paper information (step 615). Recording data are generated from the image data, and the recording data generated on the basis of the selected control constant are recorded (step 616).

As mentioned above, even when the host machine, such as the personal computer 501, is not connected to the inkjet recorder 250 or when the inkjet recorder 250 is connected to the digital camera 502 or the portable cellular phone 503 so as to be able to transmit information, recording of higher quality can be realized.

The present invention is not limited to the above-described embodiment and is susceptible to various modifications within the scope of the invention defined in claims. Needless to say, these modifications also fall within the scope of the present invention. Moreover, combinations of the embodiments also fall within the scope of the invention.

In the embodiments, the recorder corresponds to a printing device, and the recording controller corresponds to the control circuit. Moreover, the PC corresponds to a control section, and the host IF corresponds to a receiving section. The recording control section corresponds to a command interpretation section, a parameter output section, and a printing section.

(First Modification) In the above-described embodiments, the table 40 is configured from the combinations of a paper type with a paper size when the printer 1 derives the model-specific parameter. However, the table used for deriving the model-specific parameter may have an arbitrary configuration. For instance, a model-specific parameter may be derived from paper setting information, such as a print resolution, a framed image/borderless image, a paper path, or the like. Moreover, a plurality of tables used for deriving the model-specific parameter may be stored in the printer 1 so as to be able to cope with various types of print setting information items.

(Second Modification) Although the embodiments have described the case where the printer 1 drives the printer section 11 to thus subject to printing the print data included in the data received from the PC 2, printing to which the print data are subjected by the printer 1 is not limited to the printing operation. For example, printing operation to which the print data are subjected may include image processing. In that case, the printing section includes an image processing section, and the model-specific parameter includes a parameter used during image processing.

(Third Modification) Although the above-described embodiment has described a case where the predetermined print setting information is used as predetermined information, the predetermined information acquired by the printer drive 2a from the printer 1 for ascertaining whether or not the printer driver 2a of the printer can derive a model-specific parameter is not limited to the print setting information. For example, the predetermined information may be a model name of the printer 1; the flag of the printer 1 may be ascertained as predetermined information; or information such as a code compatible with the printer 1 may be ascertained as the predetermined information.

(Fourth Modification) In the above embodiment, the printer 1 may determine whether or not it is compatible with each print commands transmitted from the printer driver 2a; may report the result of determination to the printer driver 2a; and may transmit the print command compatible with the printer driver 2a. Moreover, the printer 1 may determine whether or not each control constant (parameter) transmitted from the printer drive 2a is usable; may report the result of determination to the printer driver 2a; and may transmit the print command compatible with the printer driver 2a. The control constant to be transmitted may be a control constant used for referring to the table stored in the EEPROM 16 or a control constant for which reference is not made to the table.

(Fifth Modification) In the embodiments, the case where the printer 1 and the PC 2 are connected together by way of the USB cable 3 is embodied. However, as a matter of course, the present invention can be applied to a mode of another wired communication or a mode of wireless communication using Bluetooth or the like.

(Sixth Modification) the embodiments have described a case where the print data are transmitted from the PC 2, which is a host machine, to the printer 1. A device other than the PC may be employed as the host machine. Moreover, the printer driver compatible with the printer 1 is not necessarily incorporated in the host machine. For instance, even when connected to the host machine having a comparatively-small amount of memory, such as a portable terminal, the printer 1 can derive the model-specific parameter from the predetermined print setting information. Hence, a high-quality print image can be output.

(Seventh Modification) In the above-described embodiments, the printer 1 derives the model-specific parameter from the table 40 by use of the print setting information in the PC 2. However, the method for deriving the model-specific parameter is not limited to that mentioned above. For instance, a model-specific parameter may be computed through arithmetic operation, so long as print setting information is input.

(Eighth Modification) Although in the embodiment the control constant is taken as a model-specific parameter, the essential requirement for the control constant is to be a non-general-purpose parameter (a parameter which is not common among a plurality of types of printing devices), and the control constant may be an individual-specific parameter. The individual-specific parameter is for correcting variations in an individual printing device. In each of the printing devices, a relative position between the platen and the carriage, a relative position between the carriage and the paper detection sensor, or the like, varies for reasons of machining accuracy or mounted statuses of components. Consequently, in order to achieve the same print result from all the printing devices, parameters used for correcting the variations are required. These parameters are parameters compatible with the respective printing devices; namely, individual-specific parameters.

What is claimed is:

1. A printing device comprising:
   a receiving section which receives data from a host machine;
   a nonvolatile storage medium where control constants are stored in relation to print setting information in the form of at least one table;
   a parameter deriving section which derives, from the table in the nonvolatile storage, the control constants in association with a combination of a plurality of print setting information included in the received data, the print setting information being set on the host machine; and
   a printing section which performs printing based on the print setting information, the control contents and print data,
   wherein, when the combination of the plurality of print setting information included in the data received by the receiving section includes paper type and paper size, the parameter driving section derives the control constants from the table,
   wherein the host machine determines whether or not the printing device can derive the control constants from said printing device on the basis of predetermined information acquired from said printing device, and
   wherein the host machine generates the data, which includes the print setting information but not said control constants, when said printing device can derive said control constants from said printing device,
   wherein the control constants include a transporting amount of a paper, an ink quantity of an ink droplet, and a size of an ink droplet.

2. The printing device according to claim 1, wherein the printing section performs printing based on the control constants and the print data when the data received by the receiving section includes the control constants.

3. The printing device according to claim 2, wherein, when some control constants required for printing are received by the receiving section, remaining control constants required for printing are derived by said parameter deriving section.

4. The printing device according to claim 1, wherein said control constants are parameters unique to said printing device.

5. The printing device according to claim 1, wherein the control constants include at least one of paper-advance parameter and paper-output parameter.

6. The printing device according to claim 1, wherein the print setting information include at least one of print resolution, information indicative of whether framed image or frameless image is to be printed, paper path and print path.

* * * * *